United States Patent
Hirakawa

(10) Patent No.: US 8,508,761 B2
(45) Date of Patent: Aug. 13, 2013

(54) PRINTING APPARATUS EXECUTING A PRINT OPERATION BASED ON PRINT DATA AND A SETTING SCREEN AND METHOD

(75) Inventor: Satoshi Hirakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 585 days.

(21) Appl. No.: 12/185,273

(22) Filed: Aug. 4, 2008

(65) Prior Publication Data

US 2009/0040546 A1 Feb. 12, 2009

(30) Foreign Application Priority Data

Aug. 8, 2007 (JP) .................. 2007-207022

(51) Int. Cl.
*G06F 3/12* (2006.01)
(52) U.S. Cl.
USPC .................... 358/1.14; 358/1.15
(58) Field of Classification Search
USPC ....... 358/1.14, 1.15, 1.16, 1.1, 1.13; 715/527
See application file for complete search history.

(56) References Cited

U.S. PATENT DOCUMENTS

| | | | | |
|---|---|---|---|---|
| 6,789,962 B2* | 9/2004 | Matsunaga et al. | .......... | 358/1.15 |
| 7,016,083 B2* | 3/2006 | Kotaka | ........................ | 358/296 |
| 8,049,915 B2* | 11/2011 | Yokokura | .................. | 358/1.15 |
| 2005/0134891 A1* | 6/2005 | Ishizaki | ...................... | 358/1.13 |
| 2005/0223324 A1* | 10/2005 | Tashiro | ....................... | 715/527 |
| 2007/0223032 A1* | 9/2007 | Hashizume | ................ | 358/1.15 |
| 2007/0296748 A1* | 12/2007 | Oki | .............................. | 347/14 |
| 2009/0077499 A1* | 3/2009 | Svendsen et al. | ............ | 715/833 |

FOREIGN PATENT DOCUMENTS

| | | | |
|---|---|---|---|
| JP | 11-095942 | | 4/1999 |
| JP | 2001243031 A | * | 9/2001 |
| JP | 2004-086766 A | | 3/2004 |
| JP | 2007-136923 A | | 6/2007 |
| JP | 2008242642 A | * | 10/2008 |

* cited by examiner

*Primary Examiner* — Benny Q Tieu
*Assistant Examiner* — Juan M Guillermety
(74) *Attorney, Agent, or Firm* — Canon USA Inc. IP Division

(57) ABSTRACT

A method used by printing apparatus executing a job based on a print setting accepted via an operation unit including accepting a stop instruction for stopping a print operation for the job via the operation unit and displaying a setting screen reflecting a print setting made for the job for which the print operation is stopped, in response to acceptance of a stop instruction.

18 Claims, 16 Drawing Sheets

FIG. 16

| DIRECTORY INFORMATION |
|---|
| PROGRAM-CODE GROUP CORRESPONDING TO STEPS SHOWN IN FLOWCHART OF FIG. 4 |
| PROGRAM-CODE GROUP CORRESPONDING TO STEPS SHOWN IN FLOWCHART OF FIG. 10 |

PRINTING APPARATUS EXECUTING A PRINT OPERATION BASED ON PRINT DATA AND A SETTING SCREEN AND METHOD

BACKGROUND OF THE INVENTION

1. Field of the Invention

The present invention relates to a printer control apparatus and method more specifically, a printer that can stop execution of a job based on an instruction transmitted from a user.

2. Description of the Related Art

Currently, there are apparatuses such as printers performing printing based on print settings accepted via an operation panel and/or a printer driver. When using these printers, the user may find a mistake in print settings made for a job after submitting the job to the printer. In that case, the user needs to cancel the job and correct the print settings, and submit the job to the printer again. To make the operation more simple, there have been advances to make print settings changeable. For example, print settings being made for a job including a mistake, after the job is submitted have been proposed, as disclosed in Japanese Patent Laid-Open No. 11-095942.

However, the technology disclosed in Japanese Patent Laid-Open No. 11-095942 has the following problem. When a print operation is performed for a job for where print settings are made and stopped, the user has difficulty using the print settings made for the job for which the print operation is stopped.

SUMMARY OF THE INVENTION

An embodiment of the present invention provides a printer and a control method used for the printer, a storage medium, and a program which overcome the above-described problem.

According to an embodiment of the present invention, when a print operation for which a print setting is made is stopped, a print setting made for the job for which the print operation is stopped is enabled according to a method performed based on an instruction from the user so that the operation efficiency is improved.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 16 illustrates a group of program codes according to an embodiment of the present invention.

DESCRIPTION OF THE EMBODIMENTS

Hereinafter, embodiments of the present invention will be described with reference to the attached drawings.

<General Configuration of POD (Print On Demand) System>

Figure 1:
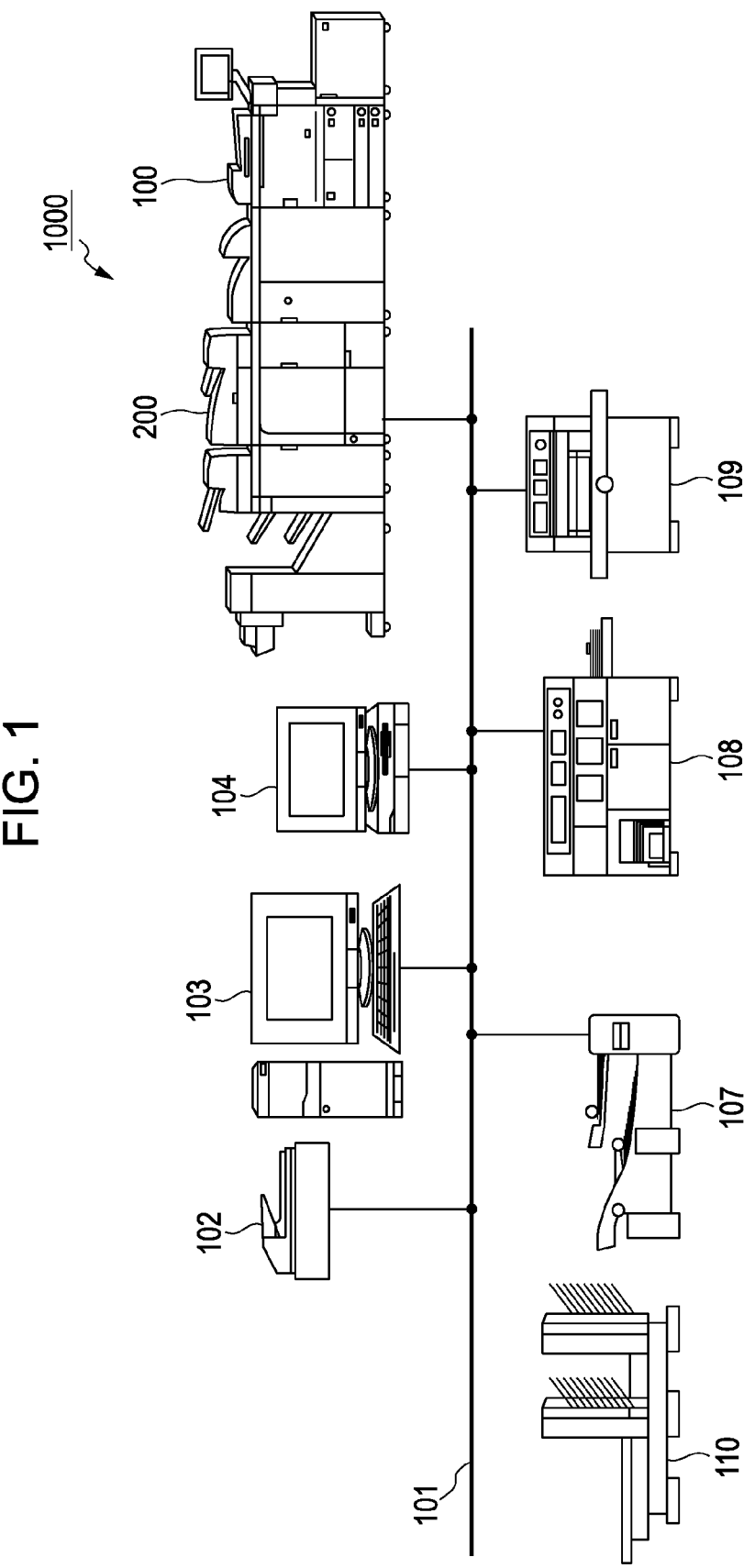
FIG. 1 is a schematic diagram showing the general configuration of a POD (Print On Demand) system including a printer according to an embodiment of the present invention.

FIG. 1 is a schematic diagram showing the general configuration of a POD system according to an embodiment of the present invention. The POD system includes a print system 1000, a scanner 102, a server computer (PC) 103, and a client computer (PC) 104 that are connected to one another via a network 101. Further, the POD system includes a paper folder 107, a trimmer 109, a saddle-stitch-bookbinding machine 110, a case binding machine 108, etc.

The print system 1000 includes plural types of devices and/or apparatuses such as a printer 100, a sheet-processing apparatus 200, etc. In the embodiment, a multifunction peripheral (MFP) having plural functions including a copy function, a printer function, etc. will be described, as an example of the printer 100.

The PC 103 controls transmission and/or reception of data transmitted to and/or from various types of devices and/or apparatuses connected to the network 101. The PC 104 transmits image data to the printer 100 and/or the PC 103 via the network 101. Further, the paper folder 107 performs folding processing for sheets of paper on which data is printed through the printer 100. The case binding machine 108 performs casing-in-bookbinding processing for the sheets on which the data is printed through the printer 100. The trimmer 109 performs cut processing for a bundle of sheets on which data is printed through the printer 100. The saddle-stitch-bookbinding machine 110 performs saddle-stitch-bookbinding processing for the sheets on which data is printed through the printer 100.

When using the paper folder 107, the case binding machine 108, the trimmer 109, and the saddle-stitch-bookbinding machine 110, a user takes out the sheet on which data is printed through the printer 100 from the print system 1000, loads the sheet on a device and/or an apparatus for use so that the sheet is processed by the device and/or the apparatus.

Of the devices and/or the apparatuses included in the POD system of the embodiment, all but the saddle-stitch-bookbinding machine 110 are connected to the network 101 so that the devices and/or the apparatuses can perform data communications with one another.

<Configuration of Printer>

Figure 2:
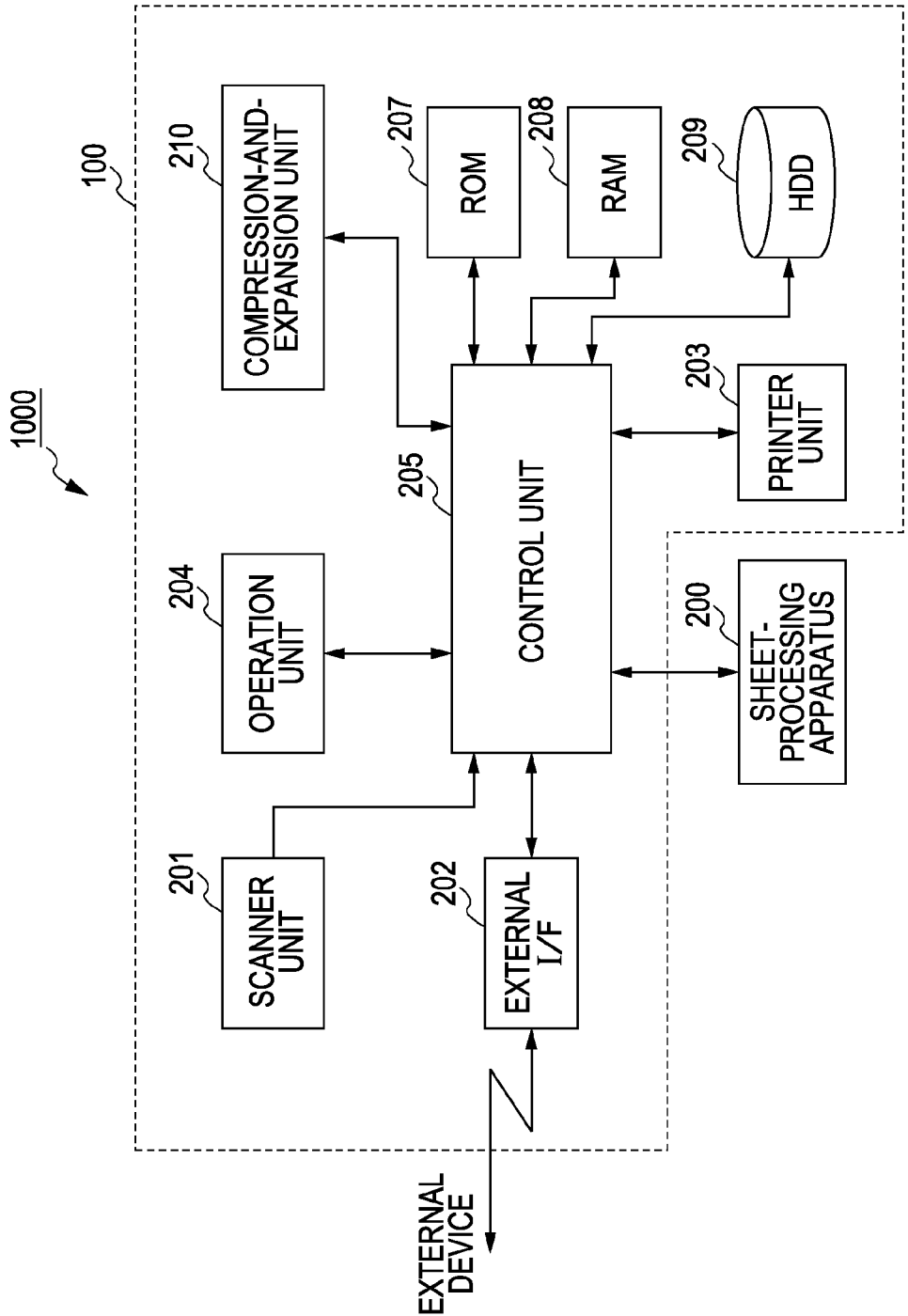
FIG. 2 is a block diagram showing the configuration of the printer according to the embodiment.

Next, the configuration of the printer 100 of the print system 1000 will be described with reference to FIG. 2. FIG. 2 is a block diagram showing the configuration of the printer 100 according to the embodiment.

The printer 100 performs a print job for which the user makes an execution request. Further, an arbitrary number of sheet-processing apparatuses 200 can be connected to the printer 100. The print system 1000 is configured so that the sheet-processing apparatus 200 connected to the printer 100 can perform sheet processing for the sheet on which data is printed through the printer 100.

The sheet-processing apparatus 200 can communicate with the printer 100, so as to perform various kinds of sheet-processing procedures including punching processing, cutting processing, shift-paper-output processing, the folding processing, etc. based on instructions transmitted from the printer 100.

The printer 100 includes a scanner unit 201, an external interface (I/F) unit 202, a printer unit 203, an operation unit 204, a control unit 205, a read-only memory (ROM) 207, a random-access memory (RAM) 208, a hard disk (HDD) 209, and an compression-and-expansion unit 210.

The scanner unit 201 reads an image printed on a document, converts the image into image data, and transfers the image data to another unit. The external I/F unit 202 transmits and/or receives data to and/or from another device and/or another apparatus connected to the network 101. The printer unit 203 prints an image generated based on the transmitted image data on a sheet. The operation unit 204 includes a hard-key-input unit and/or a touch panel, so as to accept an instruction issued from the user via the hard-key-input unit and/or the touch panel. Further, the operation unit 204 displays various images on the touch panel of the operation unit 204.

The control unit 205 has centralized control over processing, print control, etc. performed by various units provided in the print system 1000. That is to say, the control unit 205 controls operations of the printer 100 and the sheet-processing apparatus 200 connected to the printer 100. The ROM 207 stores various programs executed by the control unit 205. For example, the ROM 207 stores at least one program provided to make various processing procedures shown in flowcharts of FIGS. 4 and 10, which will be described later, executable and/or a display-control program provided to make various setting screens (setting screen) displayable. Further, the ROM 207 stores a program provided so that the control unit 205 interprets a page-description-language (PDL) code data transmitted from the PCs 103 and 104, etc. and develops the interpreted data to raster-image data. The ROM 207 further stores various programs provided for a boot sequence, font information, etc.

The RAM 208 stores image data transmitted from the scanner unit 201 and/or the external I/F unit 202, various programs stored in the ROM 207, data on a print setting (print settings) made by the user via the operation unit 204. Further, the RAM 208 stores information about the sheet-processing apparatus 200 (information about the number of the at least one sheet-processing apparatus 200 connected to the printer 100 (from 0 to n), functions of the sheet-processing apparatus 200, the order in which the at least one sheet-processing apparatus 200 is connected, etc.).

The HDD 209 includes a hard disk, a drive unit configured to read and/or write data from and/or onto the hard disk, etc. The HDD 209 is a large-capacity storage device storing image data that is transmitted from the scanner unit 201 and/or the external-I/F unit 202 and is compressed by the compression-and-expansion unit 210. The control unit 205 can print the image data stored in the HDD 209 through the printer unit 203 based on instructions transmitted from the user. Further, the control unit 205 can transmit the image data stored in the HDD 209 to an external apparatus such as the PC 103 via the external I/F unit 202 based on instructions transmitted from the user. Further, the HDD 209 can retain information about print jobs that had been executed by the printer 100 and/or data on a print setting that had been made for the print jobs in a history-storage area, as history information.

The compression-and-expansion unit 210 compresses and/or expands the image data or the like stored in the RAM 208 and the HDD 209 based on various compression systems including a joint bi-level image experts group (JBIG) system, a joint photographic experts group (JPEG) system, etc.

<Configuration of Operation Unit>

Figure 3:
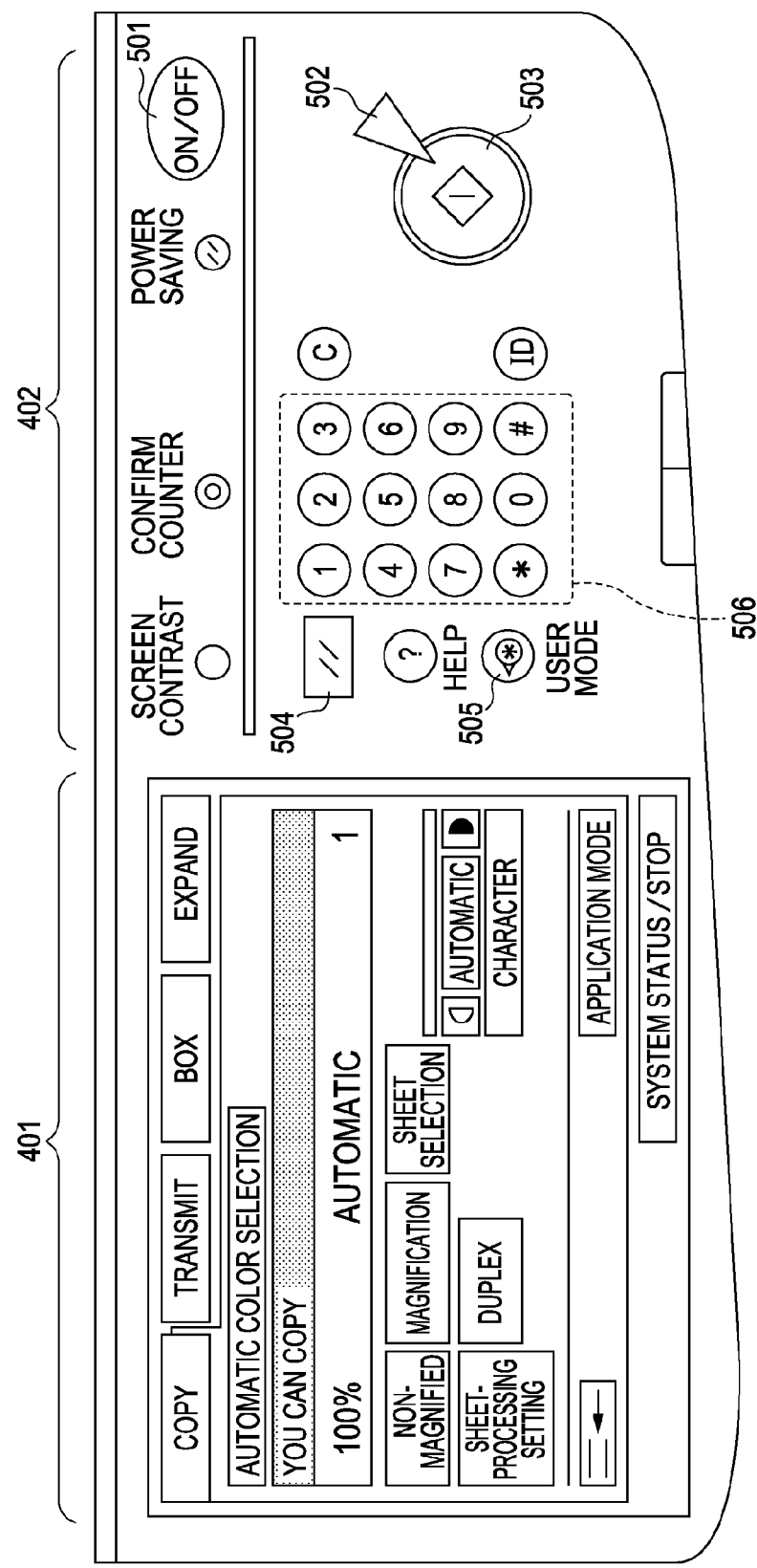
FIG. 3 shows an operation unit provided in the printer.

Next, the configuration of the operation unit 204 provided in the printer 100 will be described with reference to FIG. 3. FIG. 3 shows the operation unit 204 provided in the printer 100.

The operation unit 204 includes a touch-panel part 401 and a key-input unit 402. The touch-panel part 401 includes a liquid-crystal display (LCD) and a transparent electrode provided thereon, and displays various setting screens provided to accept instructions transmitted from the user. The touch-panel part 401 has the function of displaying various screen images and an instruction-input function provided to accept instructions transmitted from the user.

The key-input unit 402 includes a power key 501, a start key 503, a stop key 502, a user-mode key 505, and a ten key 506. The start key 503 is used to make the printer 100 start performing a copy job and/or a transmission job. The ten key 506 is used to input data on numerical values such as the number of print copies.

The control unit 205 controls the print system 1000 so that various processing procedures are performed based on user's instructions accepted via various screen images displayed on the touch-panel part 401 and/or user's instructions accepted via the key-input unit 402.

In the embodiment, the operation unit 204 provided on the printer 100 is exemplarily shown, as an example user-interface unit used for the print system 1000. However, another unit may be provided, as the example user-interface unit. For example, it may be configured that the print system 1000 can perform processing based on instructions transmitted from a user-interface unit provided on an external apparatus such as the PCs 103 and 104.

Figure 4:
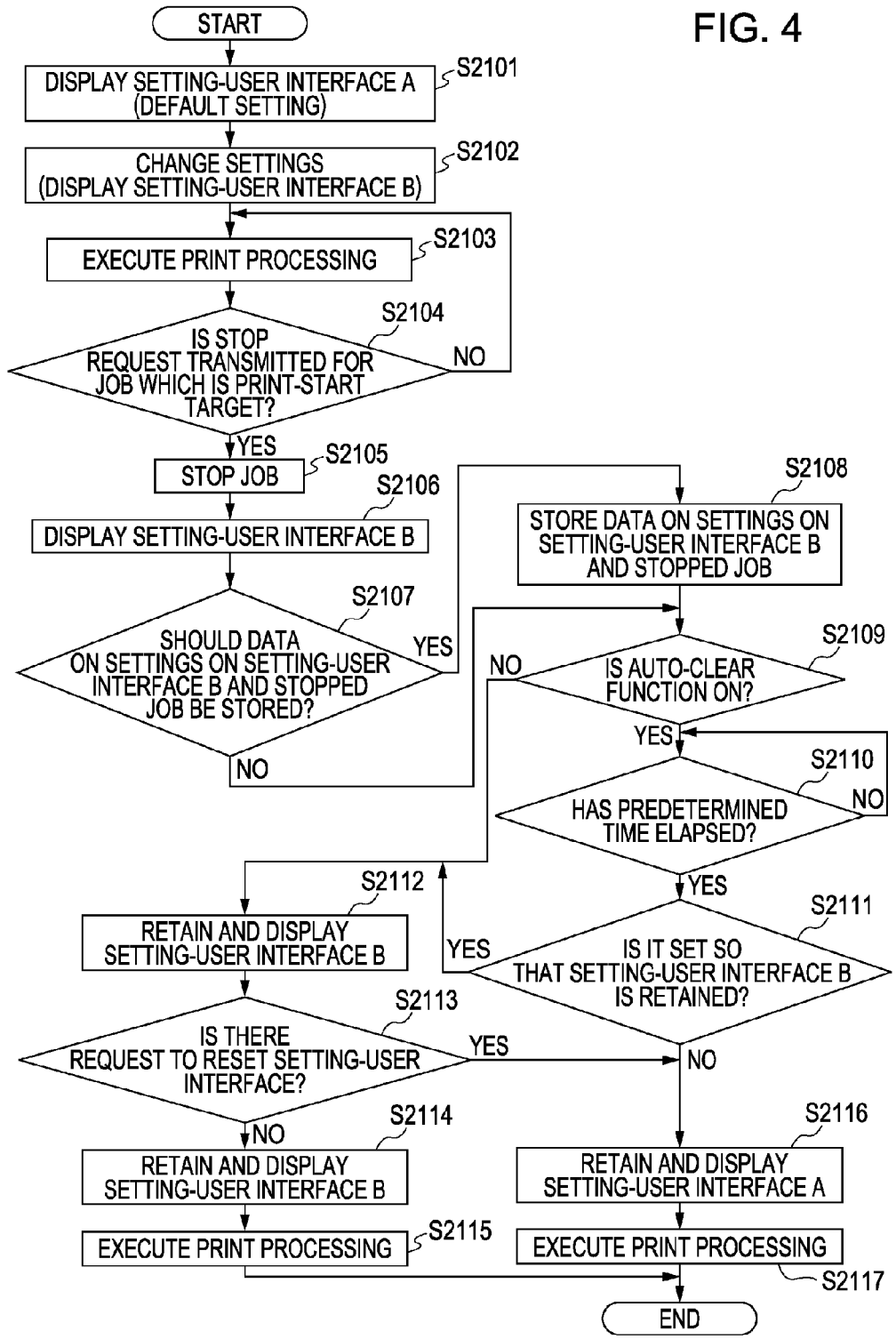
FIG. 4 is a flowchart illustrating example control procedures according to the embodiment.
Figure 5:
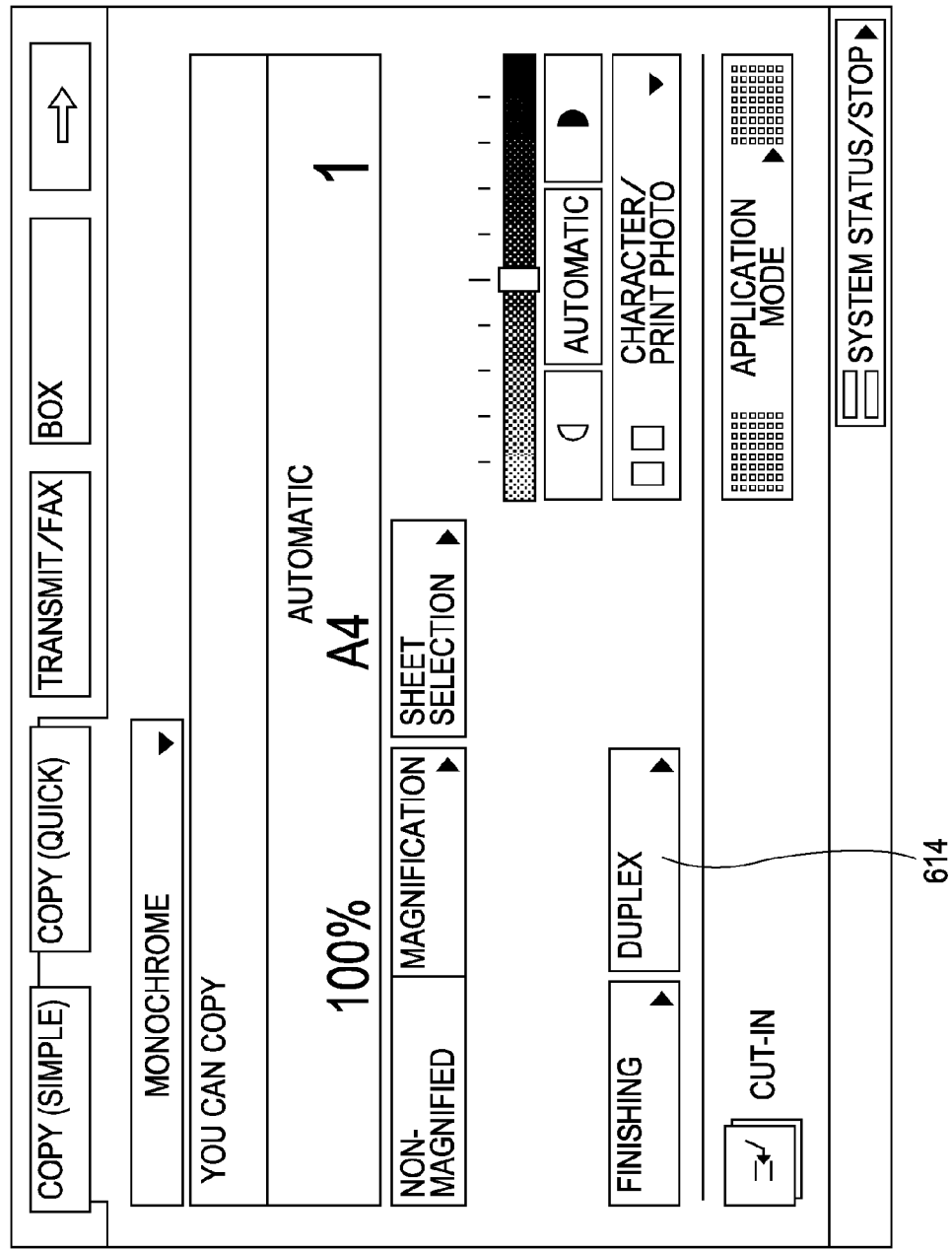
FIG. 5 shows an example user interface displayed on a touch-panel part according to the embodiment.

Next, processing performed in the printer 100 when a print job is stopped will be described with reference to FIGS. 4, 5, 6, 7, 8, 9, etc. FIG. 4 is a flowchart showing processing performed in the printer 100 of the embodiment when the print job is stopped, where the control unit 205 performs the above-described processing by reading a program from the ROM 207.

When the power of the printer 100 is turned on, or the reset key 504 is pressed, the control unit 205 determines information relating to print settings on which data is stored in the RAM 208 to be predetermined default information, at step S2101. For example, the control unit 205 stores information which reads "print-copy number: 1, sheet size: A4, one-sided printing" in the RAM 208, as default information. The above-described information is also information about conditions for processing a print job (print settings). Then, the control unit 205 displays a setting screen (hereinafter referred to as a setting screen A) shown in FIG. 5 on the touch-panel part 401, where the print-setting data stored in the RAM 208 is reflected on the setting screen A. According to the embodiment, the setting screen A is determined to be a default setting screen.

At step S2102, the control unit 205 accepts information about modifications to the print settings, the information being transmitted from the user via the operation unit 204.

The control unit 205 rewrites the print-setting data stored in the RAM 208 according to the print-setting-modification data transmitted from the user. For example, when the user presses the duplex-printing button 614 and the print settings are made so that duplex printing is performed, the control unit 205 rewrites the information stored in the RAM 208 so that the information reads "print-copy number: 1, sheet size: A4, duplex printing". Further, the control unit 205 displays a setting screen reflecting the modification data transmitted from the user (hereinafter referred to as a setting screen B) on the touch-panel part 401 based on the print-setting data stored in the RAM 208. For example, when the duplex-printing button 614 is pressed so that the print settings indicate that duplex printing should be performed, the control unit 205 displays a setting screen shown in FIG. 6 on the touch-panel part 401.

The user may register the setting screen B, which is a modification of the default setting screen A, as a default setting screen. The setting screen B shows the printing settings modified by operating the operation unit 204. Accordingly, the user can display the setting screen B on the touch-panel part 401, as the default setting screen, by turning on the power and/or pressing the reset key 504.

Next, when the user presses the start key 503, at step S2103, the scanner unit 201 starts reading data on a document and generates a print job including image data generated based on the read document data and the print settings made at step S2102 that are related to each other. Then, the control unit 205 executes print processing for the generated print job. More specifically, the control unit 205 starts a print operation for the image data based on the print settings made at step S2102.

At step S2104, it is determined whether or not the user pressed the stop key 502 during the execution of the print job. If it is determined that the stop key 502 is not pressed, the control unit 205 advances the processing to step S2103 and keeps executing the print job. After that, when the execution of the print job is completed, the control unit 205 finishes the print processing.

On the other hand, if it is determined that the stop key 502 is pressed, the control unit 205 accepts information about the determination, advances the processing to step S2105 shown in FIG. 4, and stops the currently performed print job. Further, the control unit 205 displays a stop-processing-selection-user interface shown in FIG. 8 on the touch-panel part 401. The user can select what kind of stop processing the control unit 205 should perform by pressing any one of buttons 2303, 2304, 2305, and 2306 that are shown on the stop-processing-selection-user interface shown in FIG. 8.

Hereinafter, processing corresponding to each of the buttons 2303, 2304, 2305, and 2305 will be described, where the processing is performed when the corresponding button is pressed.

I. Stop Processing A

Figure 8:
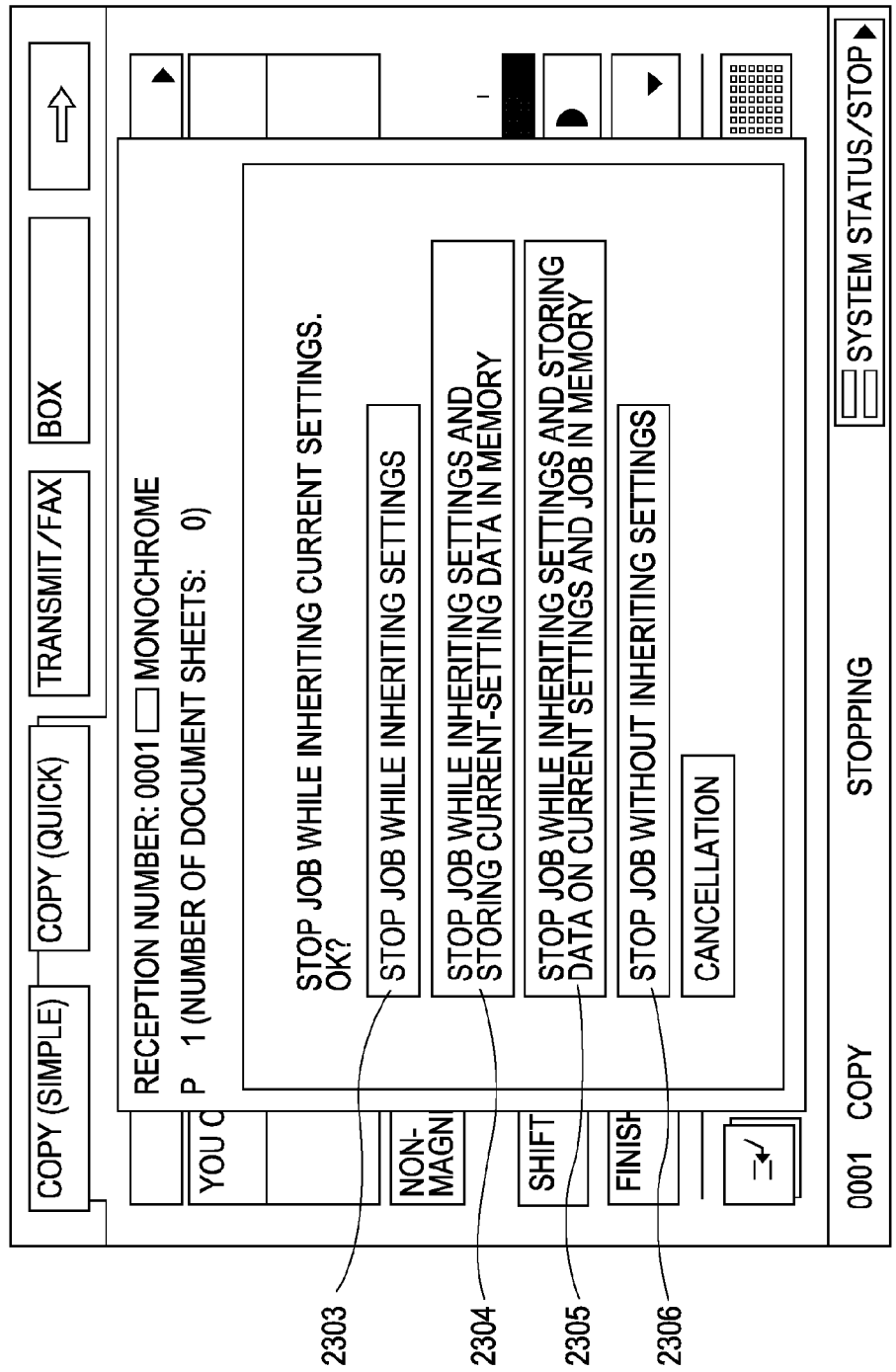
FIG. 8 shows another example user interface displayed on the touch-panel part according to the embodiment.

First, processing performed by the control unit 205 when it is determined that the button 2303 that is provided to "inherit settings and stop job" and is shown in FIG. 8 is pressed will be described. If it is determined that the button 2303 is pressed, the control unit 205 displays the setting screen B on the touch-panel part 401 at step S2106 while retaining the print-setting data stored in the RAM 208. Next, at step S2107, the control unit 205 determines that the control unit 205 is not instructed to store data on settings shown on the setting screen B and data on the stopped job, and advances the processing to steps S2109 where the control unit 205 determines whether or not an auto-clear function is enabled. The auto-clear function is provided to change the setting screen back to the default screen when no operation is performed for the operation unit 204 even though a predetermined time has elapsed since the user operated the operation unit 204 and/or the printing operation performed by the printer 100 was finished.

At that time, the control unit 205 changes the print settings on which data is stored in the RAM 208 back to the default information. If it is determined that the auto-clear function is disabled at step S2109, the control unit 205 advances the processing to step S2112. On the other hand, if it is determined that the auto-clear function is enabled, the control unit 205 advances the processing to step S2110. The control unit 205 determines whether or not the predetermined time has elapsed since the user operated the operation unit 204 and/or the print operation performed by the printer 100 was finished. If it is determined that the predetermined time has elapsed, the control unit 205 advances the processing to step S2111 and determines whether or not it is set to retain the setting screen B. At step S2111, the control unit 205 determines that the setting screen B is set to be retained even though the predetermined time has elapsed, since the button 2303 that is shown in FIG. 8 and is provided to "inherit settings and stop job" is selected, and advances the processing to step S2112.

At step S2112, the control unit 205 performs control so that the print-setting data stored in the RAM 208 and the displayed setting screen B are retained without changing the screen image shown on a display unit from the setting screen B to the default setting screen A.

After that, the control unit 205 determines whether or not the user pressed the reset key 504 of the operation unit 204, at step S2113. If it is determined that the reset key 504 is pressed, the control unit 205 advances the processing to step S2116 and displays the default setting screen A on the touch-panel part 401. Then, the control unit 205 accepts data on modifications to the print settings transmitted from the user again via the touch-panel part 401, and starts the print operation based on the print settings displayed on the setting screen when the start key 503 is pressed.

On the other hand, if it is determined that the reset key 504 is not pressed at step S2113, the control unit 205 keeps displaying the setting screen B on the touch panel B at step S2114. After that, the control unit 205 accepts data on modifications to the print settings, the data being transmitted from the user via the touch-panel part 401, and starts the print operation based on the print settings shown on the setting screen when the start key 503 is pressed at step S2115.

Figure 9:
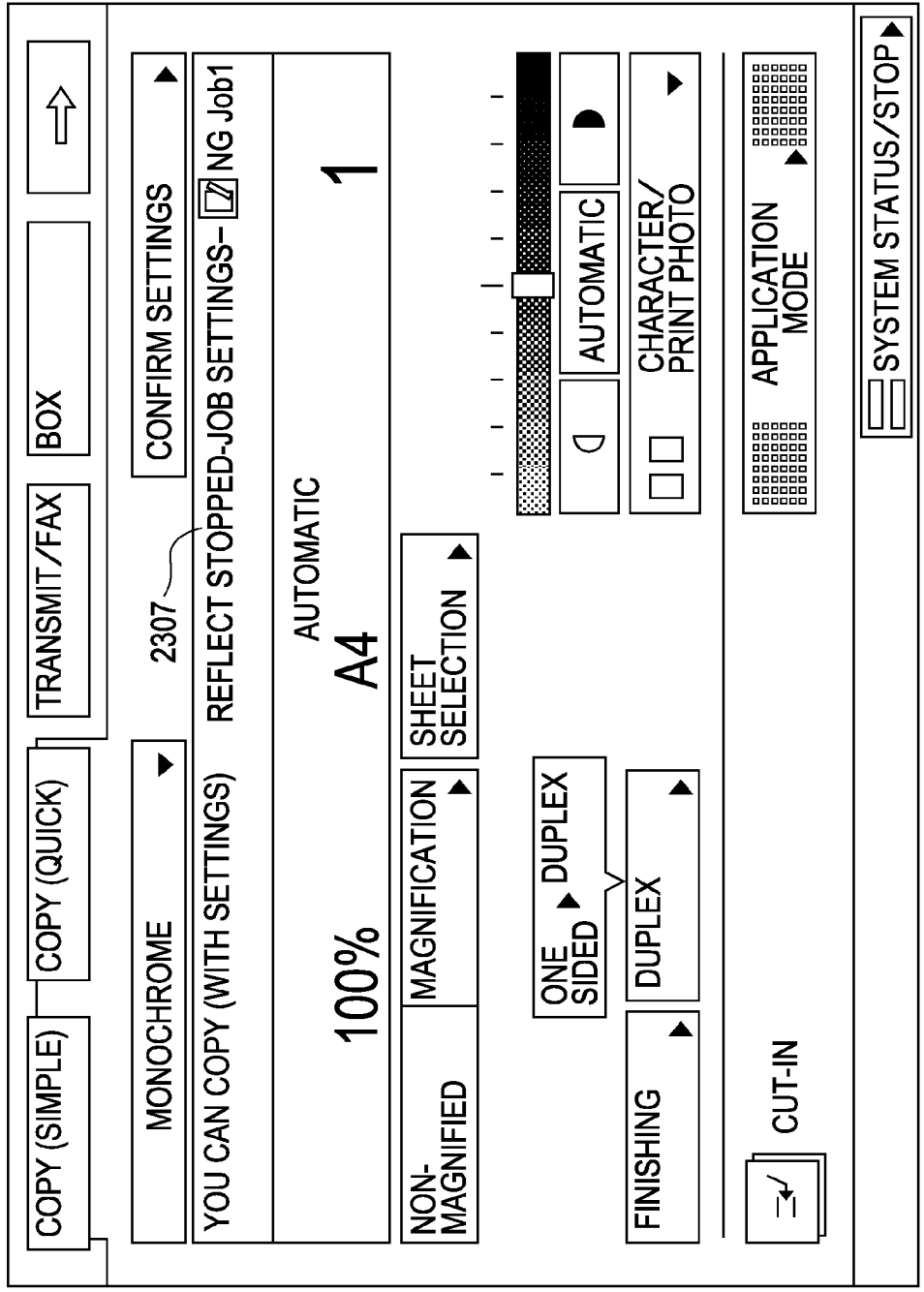
FIG. 9 shows another example user interface displayed on the touch-panel part according to the embodiment.

Namely, if the button 2303 that is provided to "inherit settings and stop job" and is shown in FIG. 8 is pressed when the print job is stopped, the control unit 205 performs control so that the setting screen B is not changed back to the default screen even though the user does not operate the operation unit 204 over a predetermined time period. In other words, the control unit 205 performs control so that the auto-clear function of the printer 100 is not activated for the setting screen B provided to be displayed when the button 2303 is pressed even though a predetermined time has elapsed. Further, when displaying the setting screen B, a message 2307 such as "reflect stop-jot settings" as shown in FIG. 9 is shown thereon so that the user can identify that the print settings of the stopped print job is reflected in the setting screen B at the first glance.

Thus, the setting screen B reflecting the print settings corresponding to the stopped print job is displayed on the touch-panel part 401. Therefore, even though the currently executed print job is stopped, the user can call up and use the print settings corresponding to the stopped print job. Consequently, if the user finds an error in part of the print settings corresponding to the currently executed print job, the user can call up and use the print settings corresponding to the stopped print job without making proper settings from the beginning after the print job is stopped.

II. Stop Processing B

Next, processing performed by the control unit 205 when it is determined that the button 2304 which is shown in FIG. 8 and is provided to "inherit settings, store currently-used setting data in memory, and stop job" is pressed.

If it is determined that the button 2304 is pressed, the control unit 205 retains the print-setting data stored in the RAM 208, and stores the print-setting data stored in the RAM 208 in a history-information-storage area of the HDD 209. Then, the control unit 205 displays the setting screen B on the touch-panel part 401, at step S2106. Information which is stored in the history-information-storage area of the HDD 209 and is related to settings is stored and held even though, for example, the setting screen displayed on the touch-panel part 401 is modified and/or changed back to the default screen by the user. The user performs specific operations so that the control unit 205 makes the RAM 208 read the above-described setting information and displays the read information on the setting screen. The specific operations will be described later.

Next, at step S2107, the control unit 205 determines that the control unit 205 is not instructed to store data on the settings shown on the setting screen B and the stopped print job, and advances the processing to step S2109. Then, at step S2109, the control unit 205 determines whether or not the auto-clear function is enabled. If it is determined that the auto-clear function is disabled, at step 2109, the control unit 205 advances the processing to step S2112. On the other hand, if it is determined that the auto-clear function is enabled, the control unit 205 advances the processing to step S2110. The control unit 205 determines whether or not a predetermined time has elapsed since the user operated the operation unit 204 and/or the printing operation performed by the printer 100 was finished. If the predetermined time has elapsed, the control unit 205 determines whether or not the setting screen B should be retained, at step S2111. Since the control unit 205 is instructed to "inherit settings" through the button 2304 shown in FIG. 8 at step S2111, the control unit 205 determines that the setting screen B is set to be retained after the predetermined time elapses, and advances the processing to step S2112.

At step S2112, the control unit 205 performs control so that the print-setting data stored in the RAM 208 and the displayed setting screen B are retained without changing the screen image shown on a display unit from the setting screen B to the default setting screen A.

After that, the control unit 205 determines whether or not the user pressed the reset key 504 of the operation unit 204, at step S2113. If it is determined that the reset key 504 is pressed, the control unit 205 advances the processing to step S2116 and displays the default setting screen A on the touch-panel part 401. Then, the control unit 205 accepts data on modifications to the print settings transmitted from the user again via the touch-panel part 401, and starts the print operation based on the print settings displayed on the setting screen when the start key 503 is pressed.

On the other hand, if it is determined that the reset key 504 is not pressed at step S2113, the control unit 205 keeps displaying the setting screen B on the touch panel B at step S2114. After that, the control unit 205 accepts data on modifications to the print settings, the data being transmitted from the user, via the touch-panel part 401, and starts the print operation based on the print settings shown on the setting screen when the start key 503 is pressed.

Namely, if the button 2304 that is provided to "inherit settings, store currently used setting data in memory, and stop job" and is shown in FIG. 8 is selected when the print job is stopped, the control unit 205 performs control so that the setting screen B is not changed back to the default screen even though the user does not operate the operation unit 204. In other words, the control unit 205 performs control so that the auto-clear function of the printer 100 is not activated for the setting screen B provided to be displayed when the button 2304 is pressed even though a predetermined time has elapsed. Further, when displaying the setting screen B, the message 2307 such as "reflect stop-job setting" as shown in FIG. 9 is shown thereon so that the user can understand that the user interface reflects the print settings of the stopped print job at the first glance.

Thus, the setting screen B reflecting the print settings corresponding to the stopped print job is displayed on the touch-panel part 401. Therefore, even though the currently executed print job is stopped, the user can call up and use data on the print settings corresponding to the stopped print job. Consequently, if the user finds an error in part of the print settings corresponding to the currently executed print job, for example, the user only has to call up and slightly change the print settings corresponding to the stopped print job without making proper settings from the beginning after the print job is stopped. Further, by storing the print-setting data stored in the RAM 208 in the history-information-storage area of the HDD 209, the user can read the print settings corresponding to the stopped print job at a desired time after the setting screen is changed.

III. Stop Processing C

Next, processing performed by the control unit 205 when it is determined that the button 2305 shown in FIG. 8 is pressed, the button 2305 being provided to "inherit settings, store data on currently used settings and currently performed job in memory, and stop job". When it is determined that the button 2304 is pressed, the control unit 205 retains the print-setting data stored in the RAM 208 in the RAM 208. Then, at step S2106, the control unit 205 displays the setting screen B on the touch-panel part 401.

At step S2107, the control unit 205 determines that the control unit 205 is instructed to store data on settings shown on the setting screen B and the stopped print job, and advances the processing to step S2108. Then, at step S2108, the control unit 205 stores the print-setting data and the print-job data that are stored in the RAM 208 (image data generated based on a document read by the scanner unit 201 at step S2102 in the embodiment) in the history-information-storage area of the HDD 209. The print-setting data relating to the setting data and the print-job data that are stored in the history-information-storage area of the HDD 209 are stored and held after the setting screen is modified by the user or changed back to the default screen, for example. Then, the user performs specific operations so that the control unit 205 makes the RAM 208 read the above-described data and displays the read data on the setting screen. The specific operations will be described later.

Since subsequent processing is the same as that performed during the stop processing B, the description thereof is omitted.

Thus, in the case where the button 2305 that is provided to "inherit settings, store data on currently used settings and currently performed job in memory, and stop job" and is shown in FIG. 8 is selected when the print job is stopped, the control unit 205 performs control so that the setting screen B is not changed back to the default screen even though the user does not operate the operation unit 204 over a predetermined time period. In other words, the control unit 205 performs control so that the auto-clear function of the printer 100 is not activated for the setting screen B provided to be displayed when the button 2305 is pressed even though the predetermined time has elapsed. Further, when displaying the setting screen B, the message 2307 such as "reflect stop-jot setting", as shown in FIG. 9, is shown so that the user can understand that the user interface reflects the print settings corresponding to the stopped print job at the first glance.

Thus, the setting screen B reflecting the print settings corresponding to the stopped print job is displayed on the touch-panel part 401. Therefore, even though the currently executed print job is stopped, the user can call up and use data on the print settings corresponding to the stopped print job. Consequently, if the user finds an error in part of the print settings corresponding to the currently executed print job, for example, the user only has to call up and slightly change the print settings corresponding to the stopped print job without making proper settings from the beginning after the print job is stopped. Further, by storing the print-setting data stored in the RAM 208 and print data on the print job in the history-information-storage area of the HDD 209, the user can read the print settings corresponding to the stopped print job at a desired time after the setting screen is changed.

IV. Stop Processing D

Next, processing performed by the control unit 205 in the case where it is determined that the button 2305 shown in FIG. 8 is pressed, the button 2305 being provided to "stop job without inheriting settings".

In the case where it is determined that the button 2303 is pressed, the control unit 205 displays the setting screen B on the touch-panel part 401 at step S2106 while retaining the print-setting data stored in the RAM 208. Next, at step S2107, the control unit 205 determines that the control unit 205 is not instructed to store data on settings shown on the setting screen B and print data corresponding to the stopped job, and advances the processing to steps S2109 where the control unit 205 determines whether or not the auto-clear function is enabled. If it is determined that the auto-clear function is disabled at step S2109, the control unit advances the processing to step S2112 and performs the processing corresponding to step S2112 on down described above.

On the other hand, if it is determined that the auto-clear function is enabled, the control unit 205 advances the processing to step S2110. The control unit 205 determines whether or not the predetermined time has elapsed since the user operated the operation unit 204 and/or the print operation performed by the printer 100 was finished. If it is determined that the predetermined time has elapsed, the control unit 205 determines whether or not it is set so that the setting screen B is retained, at step S2111.

At step S2111, the control unit 205 is instructed "not to inherit settings" through the button 2306 shown in FIG. 8. Therefore, after the predetermined time elapses, the control unit 205 determines that it is set so that setting screen B is not retained, and advances the processing to step S2116 where the control unit 205 rewrites the print-setting data stored in the RAM 208 into default information and displays the setting screen A on the touch-panel part 401. In other words, the control unit 205 activates the auto-clear function of the printer 100 after the predetermined time elapses.

Then, the control unit 205 accepts data on modifications to the print settings again, the data being transmitted from the user via the touch-panel part 401, and starts the print operation based on the print settings displayed on the setting screen at step S2117 when the start key 503 is pressed.

Thus, in the case where the user issues an instruction to stop the currently performed print job, the user can display the setting screen reflecting the print settings corresponding to the stopped print job on the touch-panel part 401. Further, the user can determine whether or not the auto-clear function should be activated for the setting screen for display when the print job is stopped. Further, if the cancellation button is pressed on the user interface shown in FIG. 8 after the currently-performed print job is stopped at step S2105, the control unit 205 performs control so that the setting screen A is displayed at step S2106 in place of the setting screen. Therefore, of the setting screens A and B, the user can display a desired setting screen on the touch-panel part 401 after the currently-performed print job is stopped. Further, the control unit 205 can perform display on the touch-panel part 401 so that the user can identify which of the setting screens A and B is displayed.

Figure 7:
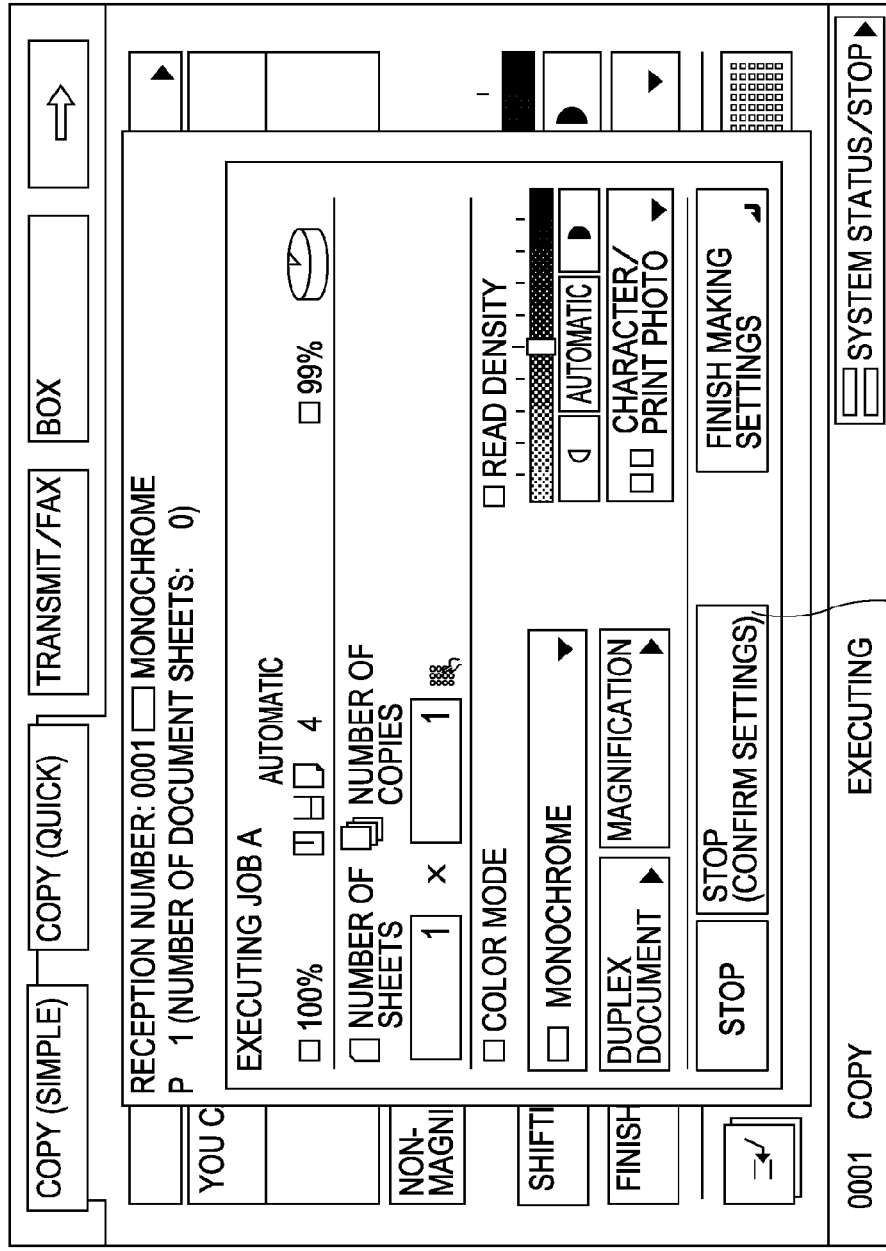
FIG. 7 shows another example user interface displayed on the touch-panel part according to the embodiment.

Further, in the embodiment, the currently performed print job is stopped through the stop key 502. However, without being limited to the embodiment, the present invention may be configured to stop the currently performed print job by using a software key displayed on the touch-panel part 401. For example, the control unit 205 displays a job-status-user interface shown in FIG. 7 on the touch-panel part 401 while the print job is performed. Then, a stop-processing-selection-user interface shown in FIG. 8 may be displayed when a stop (setting confirmation) button 2302 shown on the job-status-user interface shown in FIG. 7 is pressed.

Figure 6:
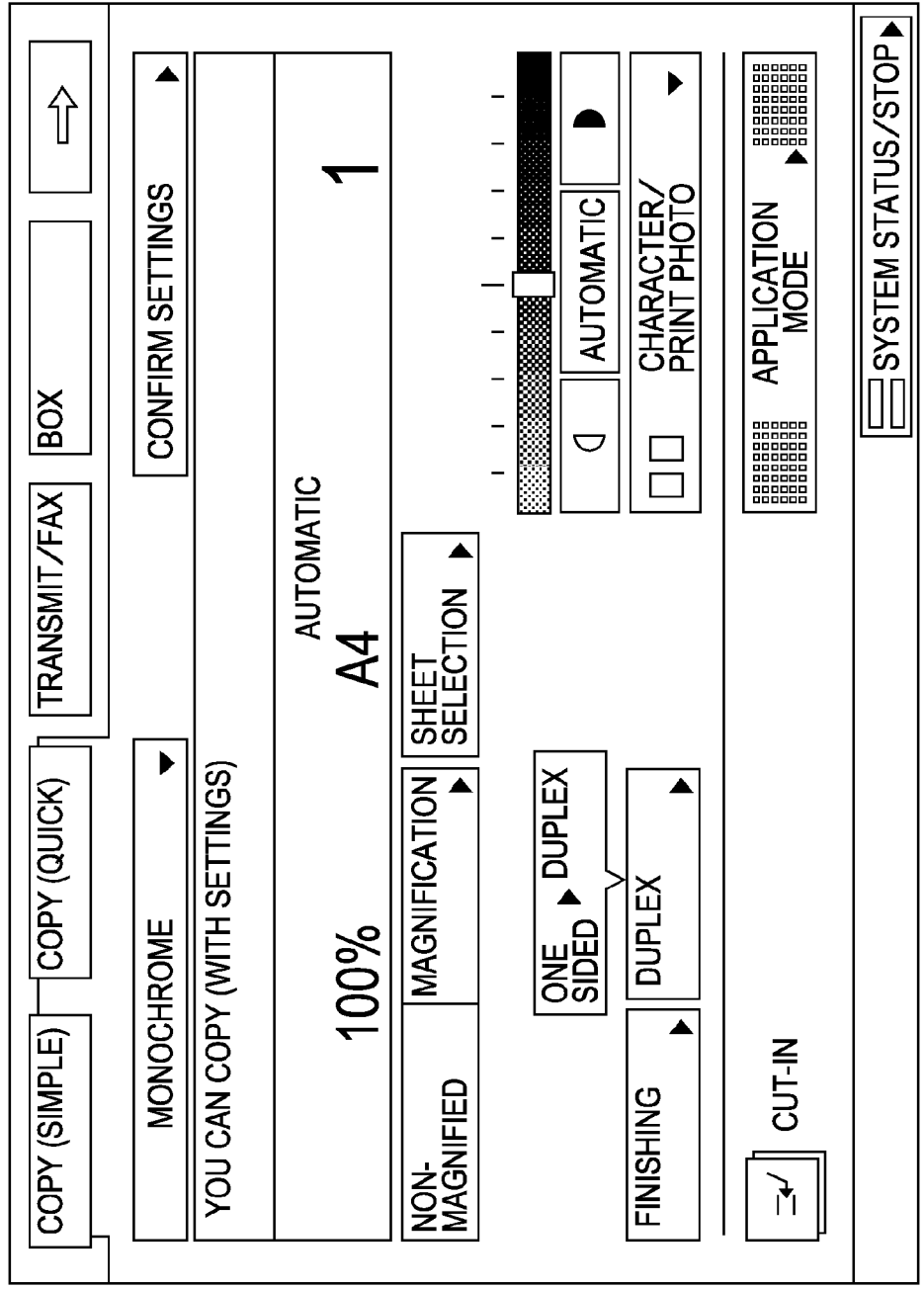
FIG. 6 shows another example user interface displayed on the touch-panel part according to the embodiment.

Further, in the embodiment, in the case where the currently performed print job is stopped, the processing corresponding to step S2106 on down shown in FIG. 4 is performed for the stopped print job. However, without being limited to the embodiment, in the case where a print job for which a print-execution request is issued through the start key 503 in the state where the print settings are made, as shown in the displayed user interface of FIG. 6, is stopped before the execution of the print operation is started, the processing corresponding to step S2106 on down may be performed for the print job for which the print operation is stopped. Therefore, the user can use the print settings corresponding to the print job for which the print operation is stopped even though the print operation is stopped before the execution of the print operation is started.

Further, the processing corresponding to step S2105 on down shown in FIG. 4 may be performed for a print job for which the print operation is stopped through, for example, the cancel key 504, before a print-execution request is made in the state where the print settings are made as shown in FIG. 6. However, for a print job for which the print operation is stopped before the print-execution request is made, print data for printing corresponding to the print job is not yet transmitted even though the control unit 205 accepts a stop instruction transmitted from the user. Therefore, when the button 2305 shown on the display-user interface shown in FIG. 8 is pressed, control should be performed so that an alarm indicating that the print data corresponding to the print job is not provided is displayed and a message advising the user to input the print data is displayed.

After that, when accepting print data corresponding to the print job via the scanner unit 201 or the like, the print data being transmitted from the user, the control unit 205 stores data on the accepted print job in the HDD 209 in relation to the print settings corresponding to a print-setting screen set via the display-user interface shown on FIG. 6. Consequently, the user can use the print settings corresponding to the stopped print job at a desired time even though the print operation is stopped before execution of the print operation is started.

Further, when the print data corresponding to the print job is accepted, the user can use the print data corresponding to the print job in addition to the print settings corresponding to the stopped print job at a desired time.

As described above, in the case where the user instructs the printer 100 to stop performing processing for the accepted job by pressing the stop key 502 and/or the stop button 2302 shown on the user interface shown on FIG. 7, the control unit 205 performs the following processing. The control unit 205 performs any one of the stop processing A, the stop processing B, the stop processing C, and the stop processing D. Further, it may be determined which of the above-described stop processing procedures A to D should be performed as default stop processing in advance. Consequently, stop processing can be performed without waiting until the user selects the stop processing when the currently performed print job is stopped.

Figure 10:
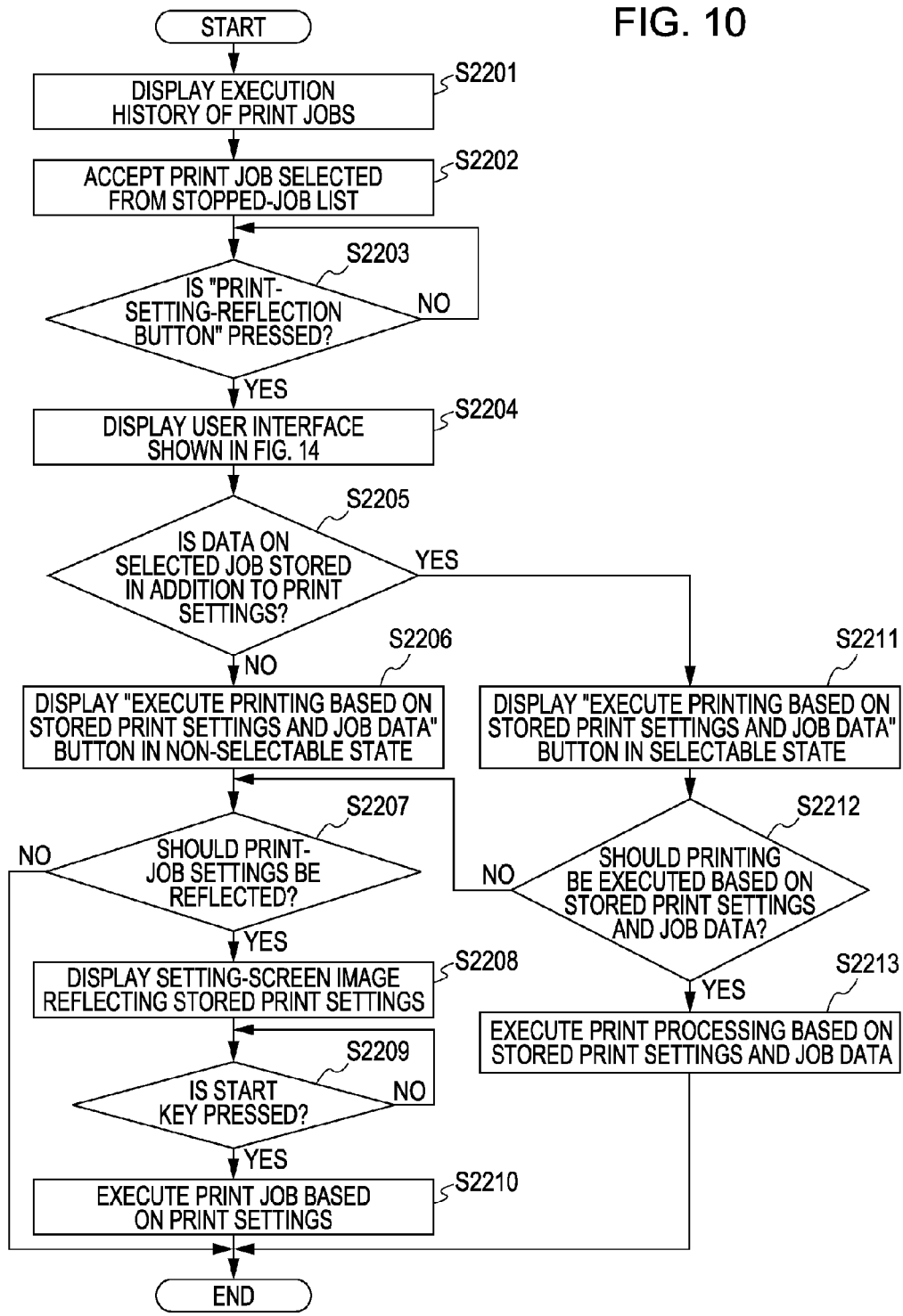
FIG. 10 is a flowchart illustrating example control procedures according to the embodiment.

Next, processing performed in the printer 100 when the user performs specific operations, so as to read and use the print-setting data stored in the history-information-storage area of the HDD 209, will be described with reference to FIGS. 10, 11, 12, 13, 14, and 15. FIG. 10 is a flowchart showing processing performed in the printer 100 according to the embodiment, and the control unit 205 reads a program from the ROM 207 and executes the read program.

First, when the user logs in to the printer 100, the control unit 205 displays the setting screen shown in FIG. 6 on the touch-panel part 401. Then, when a "job history" key 2401 is pressed after the "system-status/stop" button shown on the setting screen A shown in FIG. 6 is pressed by the user, the control unit 205 displays a job-history-user interface shown in FIG. 11 on the touch-panel part 401 at step S2201.

A list 2402 showing the history of print jobs executed in the past is displayed on the job-history-user interface by the control unit 205. The control unit 205 displays information about jobs normally ended and/or jobs abnormally ended, and stopped jobs on the history list 2402 shown in FIG. 11.

Further, the accept time and the end time of each of the print jobs, the user name, the host name, the function name, the print result, etc. are displayed on the history list 2402 based on information about each job, the job information being retained in the HDD 209 when the print job is submitted.

Figure 11:
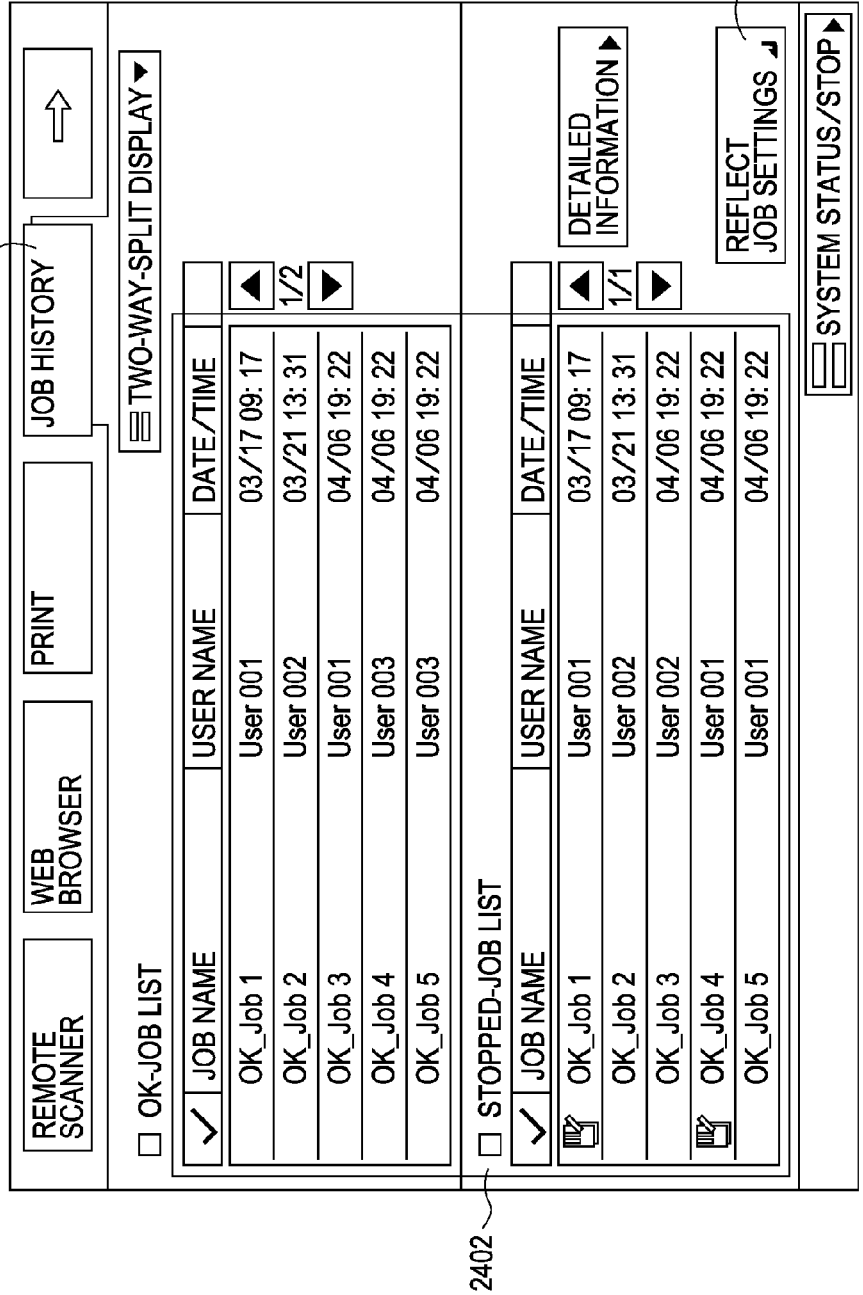
FIG. 11 shows another example user interface displayed on the touch-panel part according to the embodiment.
Figure 12:
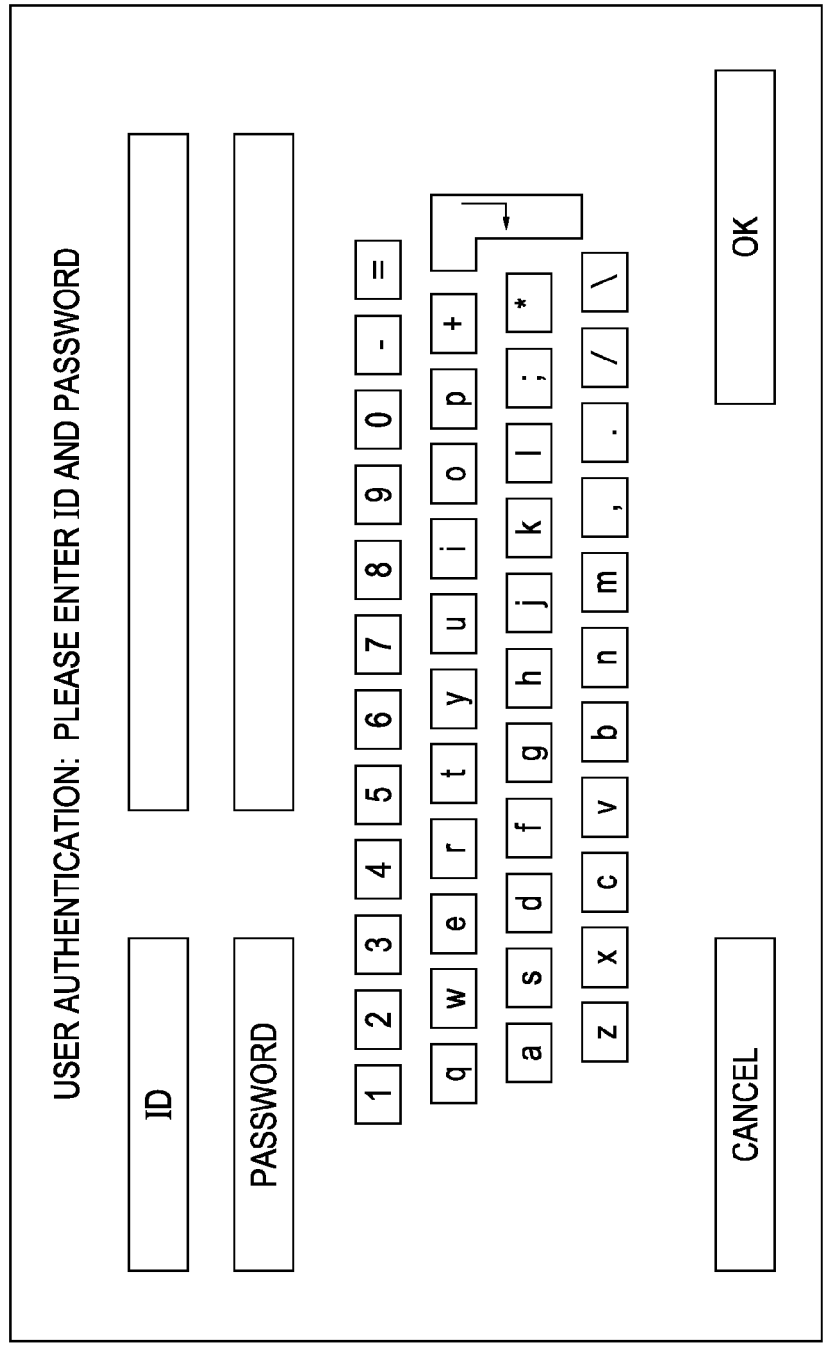
FIG. 12 shows another example user interface displayed on the touch-panel part according to the embodiment.
Figure 14:
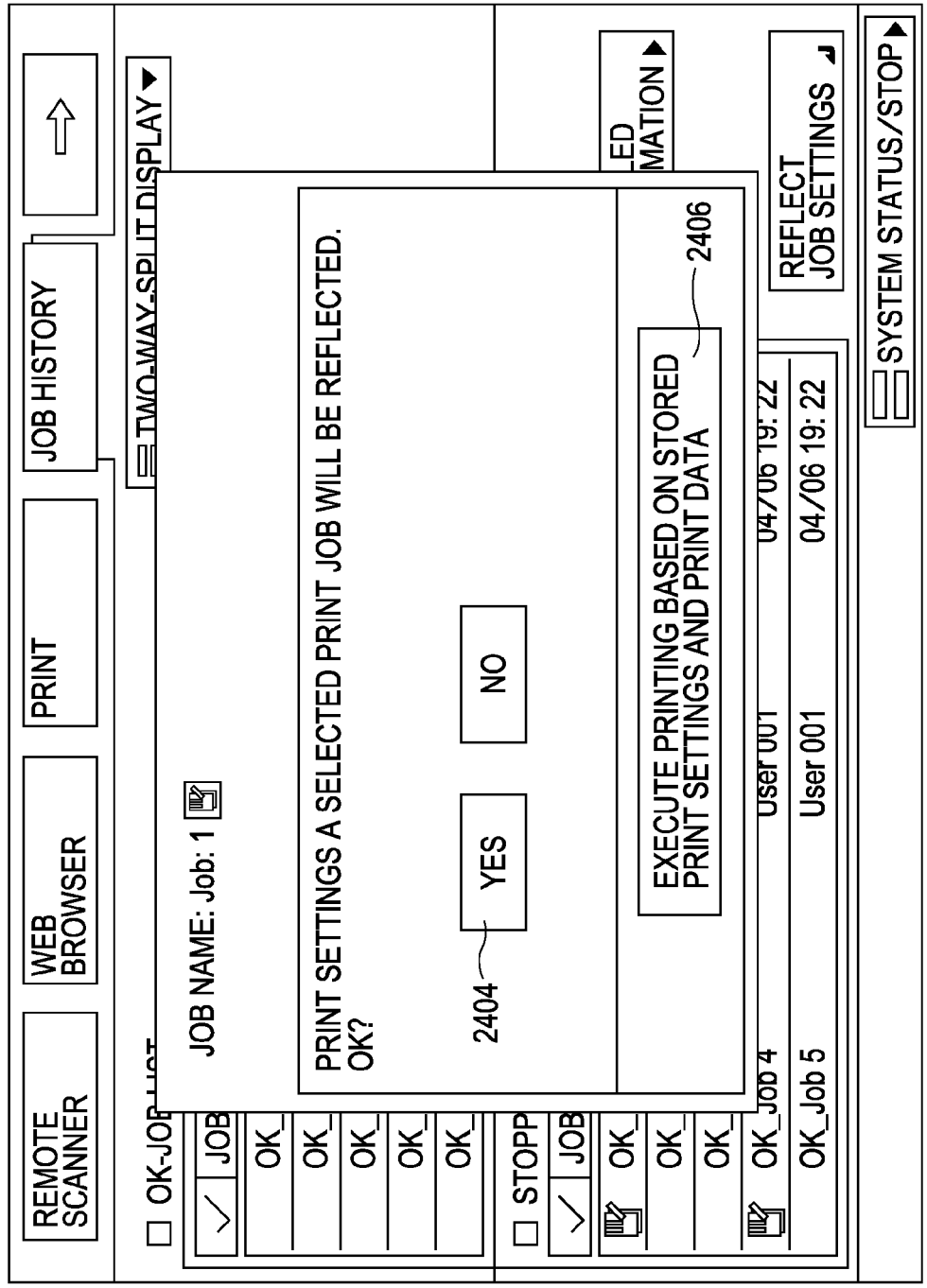
FIG. 14 shows another example user interface displayed on the touch-panel part according to the embodiment.
Figure 15:
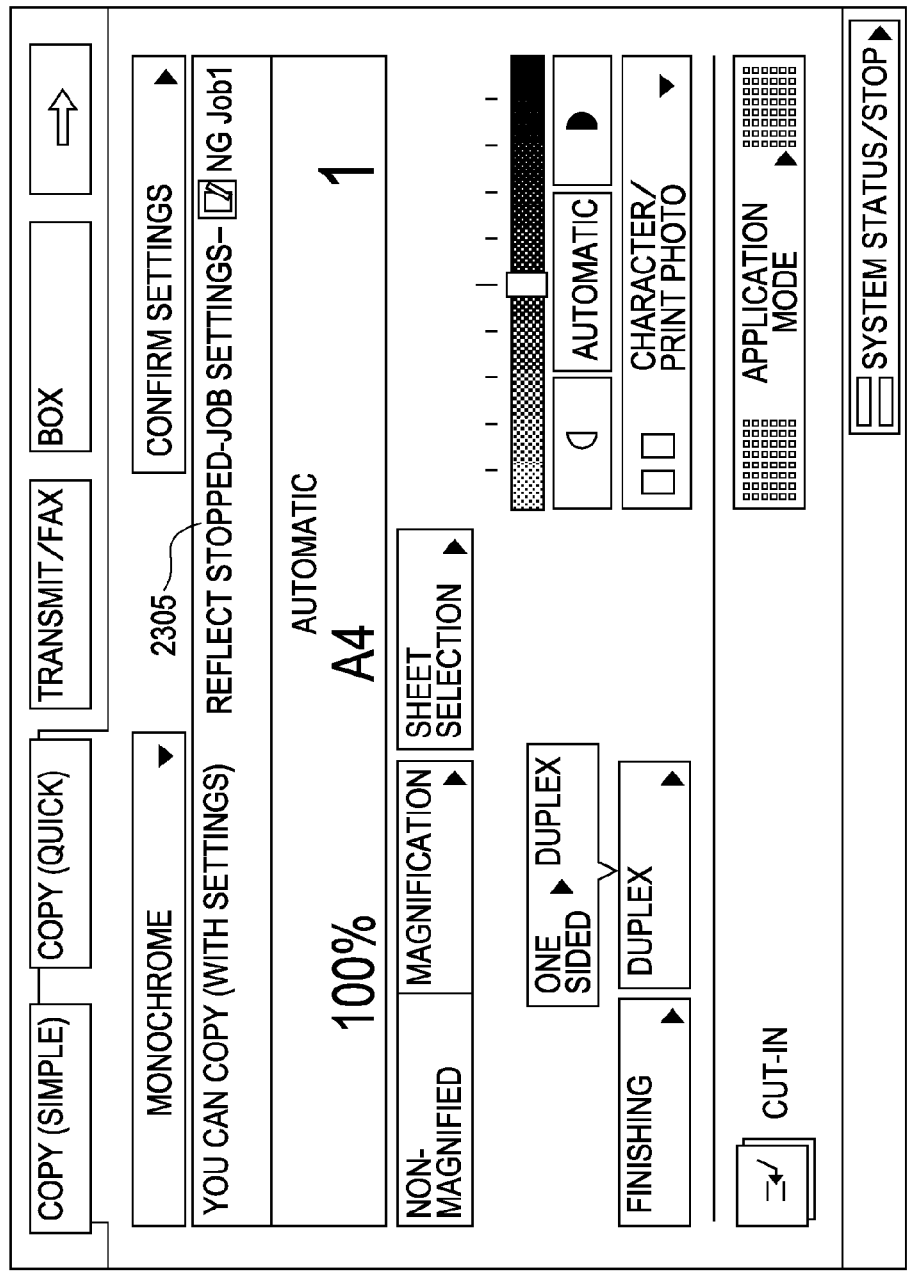
FIG. 15 shows another example user interface displayed on the touch-panel part according to the embodiment.

At step S2202, the control unit 205 accepts information about an arbitrary job selected from a stopped-job list of the history list 2402 (hereinafter, the print job selected at that time is referred to as a job C). At the subsequent step S2203, the control unit 205 advances the processing to step S2204 when a job-setting-reflect button 2403 shown on the user interface shown in FIG. 11 is pressed by the user, the user interface being displayed on the touch-panel part 401. At step S2204, the control unit 205 displays a user interface shown in FIG. 14 on the touch-panel part 401. The user interface shown in FIG. 14 is provided to make the user determine whether or not the print settings corresponding to the print job selected by the user at step S2202 should be reflected.

Then, at step S2205, the control unit 205 determines whether or not print data is stored for the job C selected at step S2202 in addition to the print settings. If it is determined that the print data is not stored, the control unit 205 advances the processing to step S2206. Then, at step S2206, the control unit 205 displays a button 2406 in a non-selectable state, the button 2406 being provided to "perform printing by using stored print settings and stored print data" and shown on the user interface of FIG. 14. Then, the control unit 205 advances the processing to step S2207.

On the other hand, if it is determined that the print data is stored in addition to the print settings at step S2205, the control unit 205 advances the processing to step S2211. Then, the control unit 205 displays the button 2406 in a selectable state.

Then, at step S2212, the control unit 205 determines whether or not the button 2406 is pressed by the user. If it is determined that the button 2406 is pressed, the control unit 205 advances the processing to step S2213, and executes printing based on the stored print-settings and the stored print data corresponding to the print job. If it is determined that the button 2406 is not pressed, the control unit 205 advances the processing to step S2207.

At step S2207, the control unit 205 determines whether or not a button 2404 indicating "yes", as shown in FIG. 14, is pressed. If it is determined that the button 2404 is pressed, the control unit 205 displays a setting screen shown in FIG. 15 on the touch-panel part 401 at step S2208, the setting screen reflecting the print-setting data stored in the HDD 209. It is preferable that the control unit 205 display a message 2405 indicating, for example, "reflect stopped-job settings" on the above-described setting screen so that the user can identify that the setting screen reflects the stopped-job history at the first glance. After calling up the above-described user interface, the user can instruct to modify the print settings based on the called-up user interface. For example, the size of a printing sheet and/or the number of print copies can be modified.

Then, at step S2209, the control unit 205 determines whether or not the start key 503 is pressed. When the start key 503 is pressed, the control unit 205 advances the processing to step S2210, generates print data by reading data printed on a document placed on the scanner unit 201, and executes printing based on the settings displayed on the setting screen.

Further, if the printer 100 needs to be logged in, the control unit 205 may perform control as shown below. The control unit 205 permits the user to use the printer 100 on the condition that the user logged in to the printer 100. For example, the control unit 205 displays a log-in user interface shown in FIG. 12 on the touch-panel part 401 and accepts transmitted data on the user identification (ID) and a password. After authenticating the user based on the transmitted user-ID data and the transmitted password data, the control unit 205 displays the default setting screen A on the touch-panel part 401.

Figure 13:
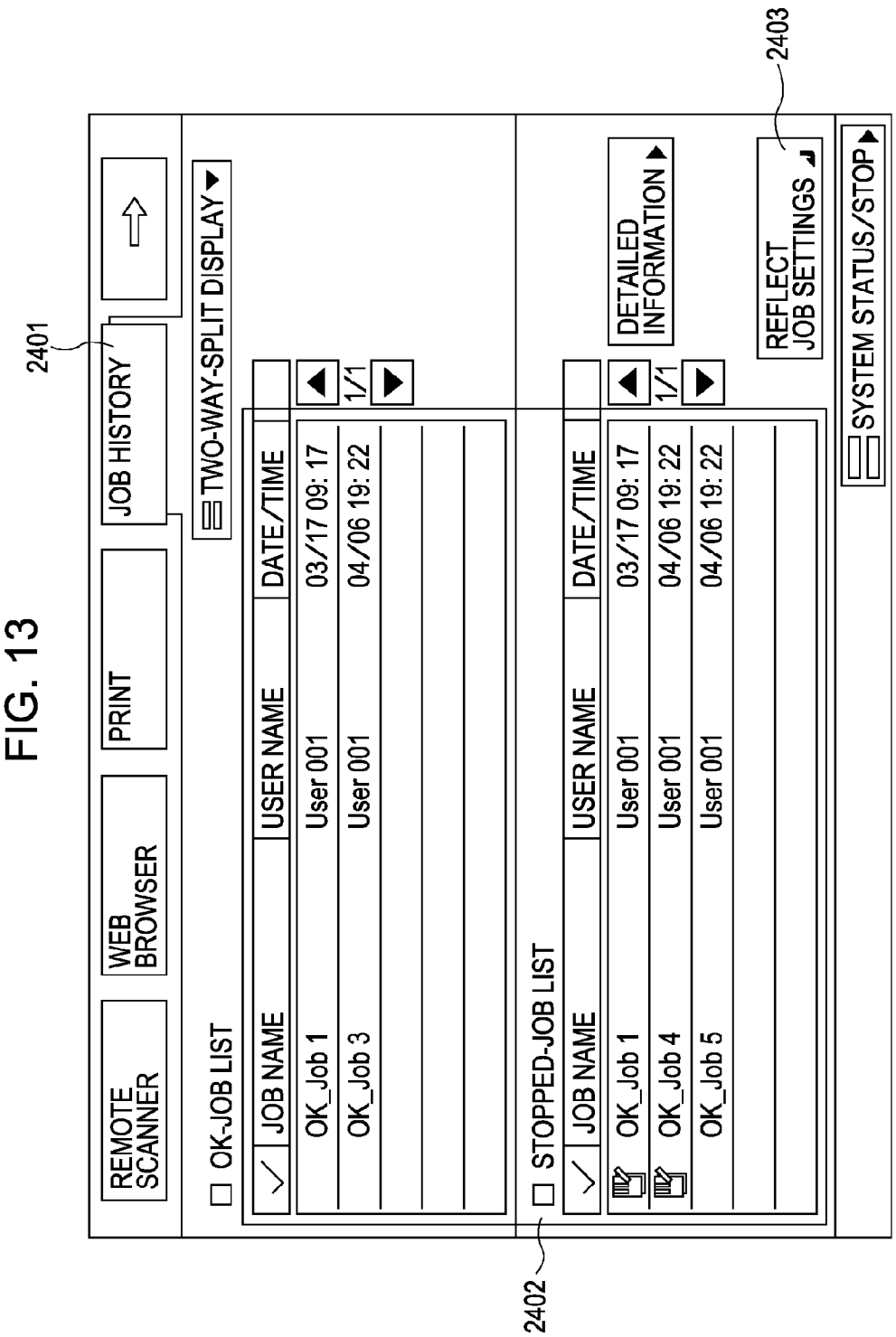
FIG. 13 shows another example user interface displayed on the touch-panel part according to the embodiment.

Then, in the case where the job-history key 2401 is pressed after the job status/stop key shown on the setting screen A is pressed, the control unit 205 determines the user who presently logs in to the printer 100 and displays history information shown in FIG. 13, stored in the HDD 209 on the touch-panel part 401 in relation to the above-described user. At that time, the control unit 205 performs control, so as not to display information about the history of jobs that had been executed by at least one user other than the user who presently logs in to the printer 100.

Through the above-described control, the user can determine whether or not data on print settings made for a print job which is the stop target should be stored in the HDD 209 when stopping the currently performed print job. When being instructed to store the print-setting data in the HDD 209, the user can display a user interface reflecting the print settings made for the print job which is the stop target on the touch-panel part 401 at a desired time, where data on the print settings is stored in the HDD 209. Then, the user can eliminate the trouble of making settings again, since the user only has to re-transmit the print data alone based on the print settings shown on the user interface reflecting the print settings made for the print job which is the stop target.

Further, when the print job is stopped, it becomes possible to determine whether or not the image data corresponding to the print job which is the stop target should be stored and held in the HDD 209 in addition to data on the print settings made for the print job which is the stop target. When being instructed to store the image data and the print-setting data in the HDD 209, the user can display a user interface reflecting the print settings made for the print job which is the stop target on the touch-panel part 401 at a desired time, where data on the print settings is stored in the HDD 209. Further, the user can read the image data corresponding to the print job which is the stop target from the HDD 209, and execute printing based on print settings made for the print job. Therefore, when the currently performed print job is stopped, the user can re-execute the printing based on the image data which is the print target and the print-setting data that are stored in the HDD 209, which eliminates the trouble of re-making the settings and re-transmitting the image data which is the print target.

Further, in the embodiment, a copy job has been described, as an example of the print job, and print settings on which data is transmitted from the operation unit 204 of the printer 100 has been described, for example. However, without being limited to the above-described embodiment, the present invention can be used for the print settings corresponding to a print job on which data is accepted by a host computer (e.g., the PC 104). In that case, the user requests the printer 100 to stop the currently executed print job from the host computer and transmits data on the print settings corresponding to the print job stopped on the printer 100's part to the PC 104, as print-setting information. It is preferable that the PC 104 display the screen image of a printer driver and/or the screen image of a remote user interface (UI) on the display part of the PC 104 based on the transmitted print-setting information, where the screen image reflects the print settings made for the stopped print job. Further, the above-described embodiment can be used for a box job allowing the user to read and execute a print job at a desired time, where data on the print job is stored in the HDD 9.

Further, even though the control unit 205 displays the user interface on the touch-panel part 401 in the printer 100 illustrated in the above-described embodiment, the touch-panel part 401 may include a control unit and a display memory on its own. In that case, the control unit 205 transmits data for display to the display memory of the touch-panel part 401, and the control unit of the touch-panel part 401 performs display based on the display data stored in the display memory.

Further, according to the embodiment, the print system 1000 includes the printer 100 and the sheet-processing apparatus 200. However, without being limited to the above-described configuration, the embodiment can be used in the case where the print system 1000 is comprised of the printer 100 provided as a single apparatus.

Further, the configuration of a data-processing program that can be read by the printer 100 according to an embodiment of the present invention will be described with reference to a memory map shown in FIG. 16.

FIG. 16 illustrates the memory map of a storage medium storing various types of data-processing programs that can be read by the printer 100 according to an embodiment of the present invention.

Further, though not particularly shown, information provided to manage a group of programs stored in the storage medium, such as version information, information about a producer, etc. may be stored. Further, information dependent on an operating system (OS), etc. provided on the program reader's side, such as data on icons, etc. provided to identifiably display the programs may be stored.

Further, data dependent on various programs is also managed by the above-described directory. Further, a program provided to install the various programs in a computer, a program provided to decompress a compressed program for installation, etc. may be stored.

The control procedures shown in FIGS. 4 and 10 according to the embodiment may be performed by the host computer through an externally installed program. In that case, the present invention can be used even though a group of information items including programs is supplied from a storage medium including a compact disk (CD)-read-only memory (ROM), flash memory, a floppy disk (FD), etc. and/or an external storage medium via a network.

It is to be understood that the object of the present invention can also be achieved by supplying a computer-readable storage medium storing program code of software for achieving the functions of the above-described embodiments to a system and/or an apparatus so that a computer (or a central-processing unit (CPU) and/or a micro-processing unit (MPU)) of the system and/or the apparatus reads and executes the program code stored in the storage medium.

In that case, the program code itself, read from the storage medium, achieves new functions of the present invention, and thus the computer-readable storage medium storing the program code constitutes the present invention.

Therefore, the program may be provided in any form including object code, a program executed by an interpreter, script data supplied to the OS, etc., so long as the program has program functions.

A storage medium provided to supply the program may be, for example, a flexible disk, a hard disk, an optical disk, a magneto-optical disk (MO), a CD-ROM, a CD-recordable (R), a CD-rewritable (RW), a magnetic tape, a nonvolatile memory card, a ROM, a digital-versatile disk (DVD), etc.

In that case, the program code itself, read from the storage medium, achieves the functions of the above-described embodiments so that the storage medium storing the program code constitutes the present invention.

Further, the program may be supplied in the following methods. For example, the program can be supplied by accessing a home page established on the Internet by using a browser of the client computer 103 and downloading the computer program itself of the present invention from the home page to a recording medium such as a hard disk. Otherwise, the program can also be supplied by downloading compressed file data including data on an automatic-install function to the recording medium such as the hard disk. Further, the program can be supplied by dividing program code generating the program of the present invention into plural file-data items and downloading each of the file-data items from different home pages. Namely, a WWW server, an ftp server, etc. that are provided to download program-file-data items used to achieve the functional processing of the present invention by using a computer to plural users are also included in Claims of the present invention.

Further, the program of the present invention may be encoded, stored in storage mediums such as CD-ROMs, and distributed to users. Then, key information used to decode the encoded program may be downloaded from the home page to a user satisfying predetermined conditions via the Internet. Through the use of the downloaded key information, the encoded program may be executed and installed in a computer so that the functions of the above-described embodiments are achieved.

Further, not only by the computer reading and executing the read program code, the functions of the above-described embodiments may be achieved. For example, by the computer executing part of or the entire actual process utilizing an OS, etc. running on the computer based on instructions of the program code, and by the executed process, the functions of the above-described embodiments may be achieved.

Further, after the program code read from the storage medium is written into a memory of a function-expansion board inserted into the computer and/or a function-expansion unit connected to the computer, control may be performed based on instructions of the program code. For example, the functions of the above-described embodiments may be achieved by a CPU or the like executing part of or the entire actual process and the executed process, the CPU being included in the function-expansion board and/or the function-expansion unit.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-207022 filed on Aug. 8, 2007, which is hereby incorporated by reference herein in its entirety.

What is claimed is:

1. A printing apparatus, comprising:
   a receiving unit configured to receive an instruction for setting a print setting;
   a display unit configured to display a setting screen where the print setting is set based on the instruction received by the receiving unit;
   a printing unit configured to execute a print operation based on print data and the print setting;
   a control unit configured to control the display unit to display a default screen in a case where an operation is not received over a predetermined time; and
   a stop instruction receiving unit configured to receive a stop instruction for stopping the print operation,
   wherein the control unit is configured to control the display unit to display, in accordance with receiving the stop instruction, a setting screen where the print setting for the print operation is set and which is for receiving a further instruction for setting a print setting for the print operation, and then control the display unit to display the setting screen where the print setting for the print operation is set and which is for receiving the further instruction, instead of displaying the default screen, in a case where the operation is not received over the predetermined time.

2. The printing apparatus according to claim 1, wherein the display unit displays a screen so that a user can identify the screen either as the setting screen where the print setting is set or as the default screen.

3. The printing apparatus according to claim 1, further comprising a storing control unit configured to relate the print setting to history information and causes a memory unit to store the print setting and the history information.

4. The printing apparatus according to claim 3, wherein the storing control unit relates the print setting and the print data to the history information, and causes the memory unit to store the history information, the print setting, and the print data.

5. The printing apparatus according to claim 4, wherein the printing unit executes a print operation based on the print setting and the print data stored in the memory unit.

6. The printing apparatus according to claim 3, wherein the storing control unit causes the memory unit to store the history information and the print setting stored in the memory unit for each user.

7. The printing apparatus according to claim 3, wherein the control unit causes the display unit to display, based on an instruction from a user, a setting screen where the print setting stored in the memory unit is set.

8. The printing apparatus according to claim 1, wherein, after the stop instruction is received, the printing unit executes the print operation based on the print data and the print setting which is set based on the further received instruction.

9. The printing apparatus according to claim 1, wherein a default print setting is set on the default screen.

10. The printing apparatus according to claim 1, wherein the stop instruction receiving unit receives, as the stop instruction, one of a first stop instruction for stopping the print operation and inheriting the print setting and a second stop instruction for stopping the print operation without inheriting the print setting,
    when the first stop instruction is received, the control unit controls the display unit to display the setting screen instead of displaying the default screen even in a case where the operation is not received over the predetermined time,
    when the second stop instruction is received, the control unit controls the display unit to display the default screen in a case where the operation is not received over the predetermined time.

11. A method used by a printing apparatus, comprising:
    receiving an instruction for setting a print setting;
    displaying the print setting set based on the received instruction on a display unit;
    executing a print operation based on print data and the print setting;
    controlling the display unit to display a default screen in a case where an operation is not received over a predetermined time;
    receiving a stop instruction for stopping the print operation; and
    controlling the display unit to display, in accordance with receiving the stop instruction, a setting screen where the print setting for the print operation is set and which is for receiving a further instruction for setting a print setting for the print operation, and then controlling the display unit to display the setting screen where the print setting for the print operation is set and which is for receiving the further instruction, instead of displaying the default screen, in a case where the operation is not received over the predetermined time.

12. The method according to claim 11, wherein the setting screen is displayed on the display unit so that a user can identify the screen either as the setting screen where the print setting is set or as the default screen.

13. The method according to claim 11, wherein the print setting is related to history information, and the print setting and the history information are stored in a memory unit.

14. The control method according to claim 13, wherein the print setting and print data are related to the history information, and the history information, the print setting, and the print data are stored in the memory unit.

15. The method according to claim 14, further comprising:
    executing a print operation based on the print setting and the print data stored in the memory unit.

16. The method according to claim 13, wherein the history information and the print setting stored in the memory unit is stored for each user.

17. The method according to claim 13, wherein a setting screen where the print setting stored in the memory unit is set can be displayed by the display unit based on an instruction transmitted from the user.

18. A non-transitory computer-readable storage medium storing instructions causing an apparatus to perform the method of claim 11.

* * * * *